(12) United States Patent
Marek

(10) Patent No.: US 6,397,711 B1
(45) Date of Patent: Jun. 4, 2002

(54) HAND TOOL

(76) Inventor: Kenneth Irvin Marek, 446 Inland Dr., #2B, Wheeling, IL (US) 60090

( * ) Notice: Subject to any disclaimer, the term of this patent is extended or adjusted under 35 U.S.C. 154(b) by 0 days.

(21) Appl. No.: 09/488,323

(22) Filed: Jan. 20, 2000

(51) Int. Cl.[7] ................................................. B25G 1/01

(52) U.S. Cl. .......................................... 81/489; 81/488

(58) Field of Search ..................... 81/489, 488, 177.5, 81/180.1; 16/110.1, 111.1; 30/231, 232, 291

(56) References Cited

U.S. PATENT DOCUMENTS

| | | | | |
|---|---|---|---|---|
| 523,850 A | * | 7/1894 | Cavanaugh | 7/109 |
| 1,374,768 A | * | 4/1921 | Ruppert | 30/249 |
| 1,378,679 A | * | 5/1921 | Jordan | 30/232 |
| 2,322,897 A | * | 6/1943 | Van Den Bogaerde, Jr. | 119/799 |
| 3,781,052 A | * | 12/1973 | Millington | 294/25 |
| 4,583,513 A | * | 4/1986 | Ellenburg et al. | 124/20 A |
| 4,825,733 A | * | 5/1989 | Chinchar | 81/177.2 |
| 5,471,700 A | * | 12/1995 | Pereira | 15/160 |
| 5,659,916 A | * | 8/1997 | Beatty et al. | 15/210.1 |
| 5,706,553 A | * | 1/1998 | Riley et al. | 16/111 R |

* cited by examiner

Primary Examiner—Joseph J. Hail, III
Assistant Examiner—David B. Thomas
(74) Attorney, Agent, or Firm—George H. Gerstman; Seyfarth Shaw

(57) ABSTRACT

A hand tool for providing increased force and accuracy for a variety of applications comprising a tool head, a first shaft and second shaft is provided. The first and second shaft each have a proximal end and a distal end, the distal ends of the shafts are adapted for connecting to a tool head. A handle having a first end and a second end is provided. The first end of the handle is attached to the first shaft and the second end of the handle is attached to the second shaft, forming a generally H-shaped configuration. A brace, generally a flexible strap, is attached to the first shaft, near the proximal end of the first shaft, and the second end of the strap is attached to the second shaft, near the proximal end of the second shaft, such that the handle and strap are generally parallel to each other. The flexible strap is adjustable such that the tool user's arm may be aligned with the first and second shafts when the handle is grasped and the tool head is applied to a work application. In this way, the strength of the user is generally applied in the direction of the work of the tool and the force to use the tool is applied by the user's arm and wrist together.

13 Claims, 6 Drawing Sheets

HAND TOOL

FIELD OF THE INVENTION

The present invention concerns a novel hand tool.

BACKGROUND OF THE INVENTION

Hand tools generally comprise a tool head on a shaft. In general, the tool head is attached to the end of a shaft such that the shaft provides a means to grasp the tool and project force to the tool head. Generally, when using such a hand tool the shaft is gripped by a hand in such a fashion that the tool head is held at an angle to the direction of the application of the user's force. As such, the force of the user is not fully utilized in the task to be accomplished. Further, some degree of accuracy is probably lost when the force applied to a tool is applied at an angle to the direction of the work to be accomplished.

Throughout history this type of hand tool has been used such that the force exerted with the tool has been generally in a direction other than the direction of the work of the head of the tool. Such use of tools has required harder work to accomplishing simple tasks as the user has wasted much effort applying his strength tangentially to the task. It would be preferable to have a hand tool wherein the user's strength is applied in the direction of the work to be accomplished.

I have invented a hand tool system that allows the user to apply more of his strength in the direction of the work to be done. By applying force in the direction of the tool head, the user may either exert less effort to accomplish a task or exert more effort and finish the task more quickly. Further, force applied in the direction of work may be applied with more finesse allowing the user to make fewer errors.

I have also found that by allowing the user to align and attach the tool to the user's arm, forces on the user are transferred from the work to the user's arm, rather than the user's wrist, causing less stress on the user's wrist and allowing the user to work with the tool longer without fatigue.

I have also found that as most hand tools comprise a tool head and a grasping means or handle, by providing an improved handle, which allows better and more accurate application of the user's strength. Further, tool heads may be interchanged on the improved handle allowing the user to have one handle for a number of interchangeable tool heads.

It is therefore an object of the present invention to provide a means for increasing the strength that can be applied on a hand tool by providing a means to direct the user's force in the direction that the tool is being used.

It is a further object of the present invention to allow the tool user greater accuracy in the use of tools by more closely aligning the direction that force is applied with the head of the tool.

It is a further object of the present invention to allow the user to use a tool for prolonged periods of time without fatiguing the user's wrist.

It is a further object of the present invention to provide a single hand tool onto which a number of hand tool heads may be attached and utilized.

Other objects and advantages of the present invention will become apparent as the description proceeds.

SUMMARY OF THE INVENTION

In accordance with the present invention, a hand tool comprising a tool head and a shaft is provided. The shaft of the hand tool comprises a proximal and a distal end the distal end of the shaft is adapted for connection to the tool head. A handle having a first end and a second end, is also provided. The first end of the handle is attached to the shaft generally perpendicularly to the shaft. A brace, having a first end and a second end is provided, the first and second end of the brace are attached to the shaft, near the proximal end of the handle, such that a loop in the brace, through which an arm may be threaded, is formed.

In the use of the hand tool of the present invention, the brace aids in the alignment of the user's arm with the shaft of the tool when the user's arm is inserted in the loop in the brace and the handle is grasped by the user's hand.

In the preferred embodiment two shafts are provided, spaced apart in a side-by-side configuration, and are joined together by a handle, generally forming a letter H. A brace, made of a woven cloth, such as canvas, is attached near to the proximal ends of both shafts, spanning the space between the shafts. The brace of the preferred embodiment aids in aligning the user's arm, and thus the force of the arm, in the direction of the use of the tool.

The preferred embodiment of the present invention includes an angle brace support means to which a variety of tool heads may be attached, in a conventional manner. In the preferred embodiment, many of the tool heads include pivot points in their attachments to the angle to allow the tool head to pivot so its working surface may be more easily applied to the surface on which the work will be done.

A more detailed explanation of the invention is provided in the following description and claims and is illustrated in the accompanying drawings.

DETAILED DESCRIPTION OF THE ILLUSTRATIVE EMBODIMENT

Figure 1:
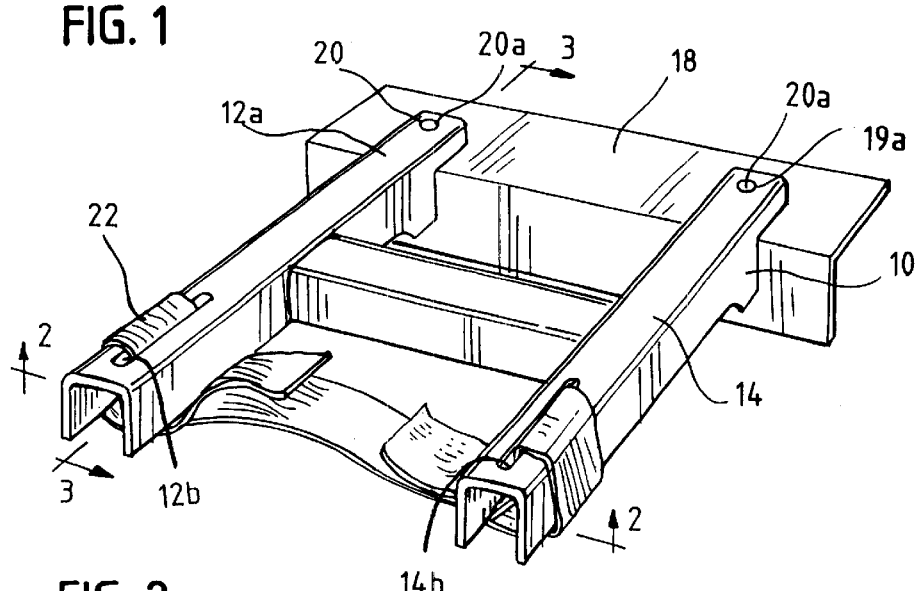
FIG. 1 is a perspective view of the hand tool of the preferred embodiment of the present invention.

Referring to the drawings, the preferred embodiment of hand tool 10 is illustrated. A first shaft 12 and a second shaft 14 are joined together by a handle 16. In the preferred embodiment, the hand tool is molded of plastic and the shafts 12, 14 and handle 16 are integral to each other. It is to be understood that separate shafts may be joined together by conventional means, such as conventional fasteners or adhesives, to a separate handle to form the hand tool of the present invention. In the preferred embodiment, the shafts 12 and 14, and handle 16 generally, have a U-shaped cross-section. The generally U-shaped cross section provides rigidity, strength, ease of holding and allows the system to be lightweight. In the preferred embodiment, shafts 12 and 14 are generally parallel to each other; however, it is to be understood that shafts 12 and 14 maybe aligned in other manners, such as distal ends close to each other and proximal ends apart, without departing from the novel scope of the present invention.

As illustrated in FIG. 1, shafts 12 and 14 are formed with overhanging sections, respectively, 12a and 14a, onto which a support member 18, such as an angle iron, is attached. In the illustrative embodiment, support member 18 is attached by fasteners 20, such as nuts and bolts, through openings 20a in shafts 12 and 14. It is, however, to be understood that any type of attachment, including welding, epoxy or other adhesives, screws, rivets or other well known means of attachment may be used without departing from the novel scope of the present invention. It is also to be understood that support member 18 may be molded along with shafts 12 and 14 and handle 16, as an integral unit, without departing from the novel scope of the present invention.

FIG. 1 further shows that a cloth brace 22 is provided as part of hand tool 10. The ends 22a of brace 22 are threaded, respectively, through openings 12b and 14b formed in shafts 12 and 14. Brace 22 spans the space between shafts 12 and 14 and its ends 22a are subsequently joined together. The ends 22a of brace 22 may be joined together in any conventional manner, including the use of hook and loop fasteners such as Velcro®, or by pins, clips, buckles or other fasteners, without departing from the novel scope of the present invention. Ends 22a of brace 22 may be unfastened to allow the insertion of the user's arm and then closed tightly about the arm to secure and align the tool and arm together. Brace 22 may also be threaded into shafts 12 and 14 in a number of different ways such that, for example, brace 22 may span shafts 12 and 14 without needing to have exposed ends 22a connected together. Further, as shown in FIG. 2, brace 22 may be made of a predefined length, allowing no adjustment, having ends 22a fixed, respectively, to shafts 12 and 14.

Brace 22 (FIG. 1) is provided so that when the user grasps handle 16, the users forearm is kept roughly parallel to shafts 12 and 14, such that the force of the user's arm is directed towards the work to which hand tool 10 is employed. While brace 22 is illustrated as a strip of woven cloth, it is to be understood that it may be made of a variety of materials including, other types of cloth or may be made of plastic or steel, leather, vinyl or other materials, without departing from the novel scope of the present invention. Brace 22 may also be formed during the molding process so that it is an integral part of hand tool 10. Openings 12b and 14b in shafts 12 and 14, may be formed during the molding process or may be cut into shafts 12 and 14 after molding, without departing from the novel scope of the present invention. Further, clips or other fasteners or adhesives or other conventional means may be used to hold brace 22 to shafts 12 and 14, without departing from the novel scope of the present invention.

Figure 2:
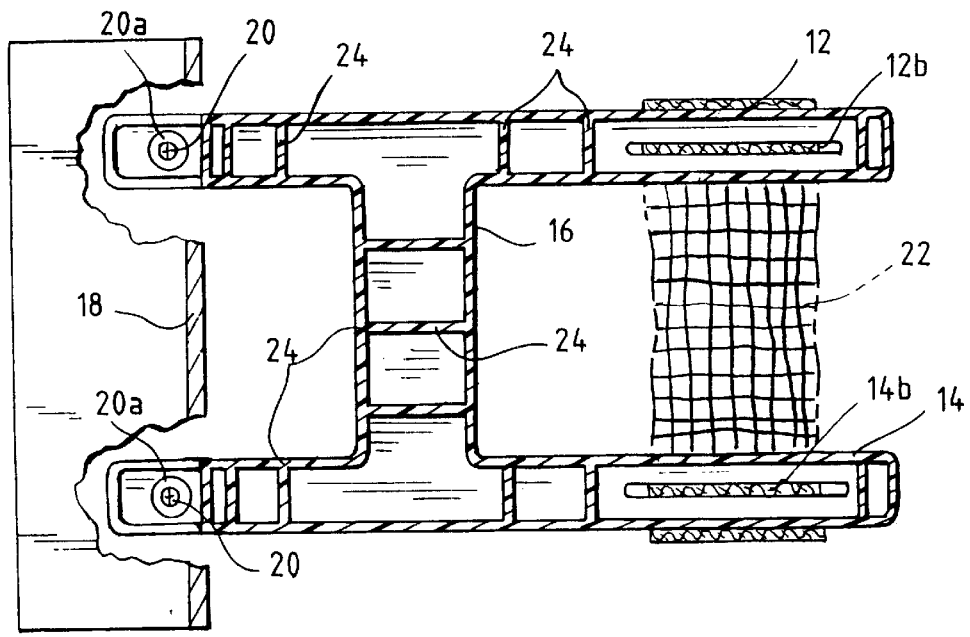
FIG. 2 is cross-sectional view, taken along the plane of line 2—2, of the hand tool of FIG. 1.
Figure 3:
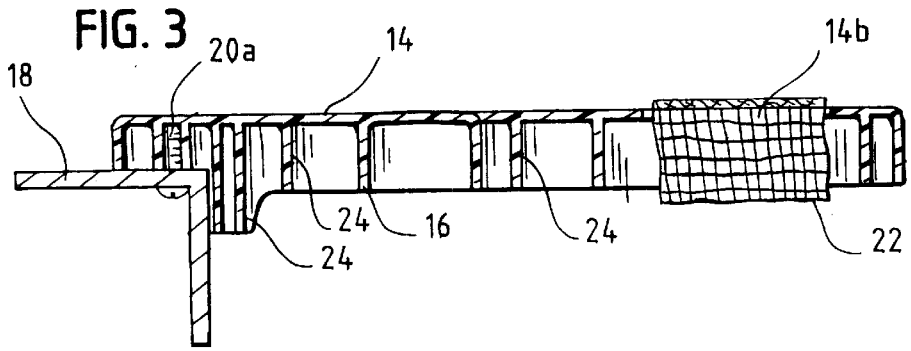
FIG. 3 is a cross-sectional view, taken along the plane of line 3—3 of the hand tool of FIG. 1.

FIG. 2 is a cross sectional view of the hand tool 10 of FIG. 1, showing support struts 24 molded into the frame of hand tool 10, for additional strength. Fastener holes 20a formed in overhang sections 12a and 14a, and openings 12b and 14b formed in shafts 12 and 14 are also shown in FIG. 2. FIG. 3 is a cross-sectional view of the shaft 12 of FIG. 2, showing support struts 24, fastener hole 20a and brace opening 12b.

Figure 4:
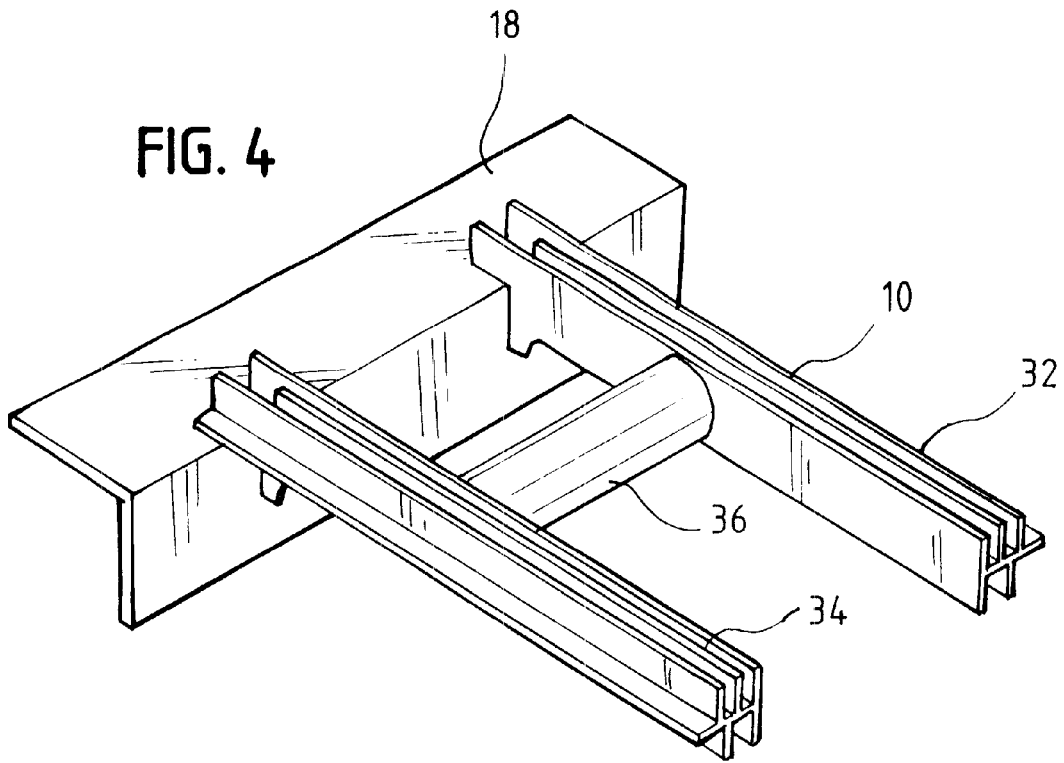
FIG. 4 is a partial perspective view of another embodiment of the hand tool of the present invention.
Figure 5:
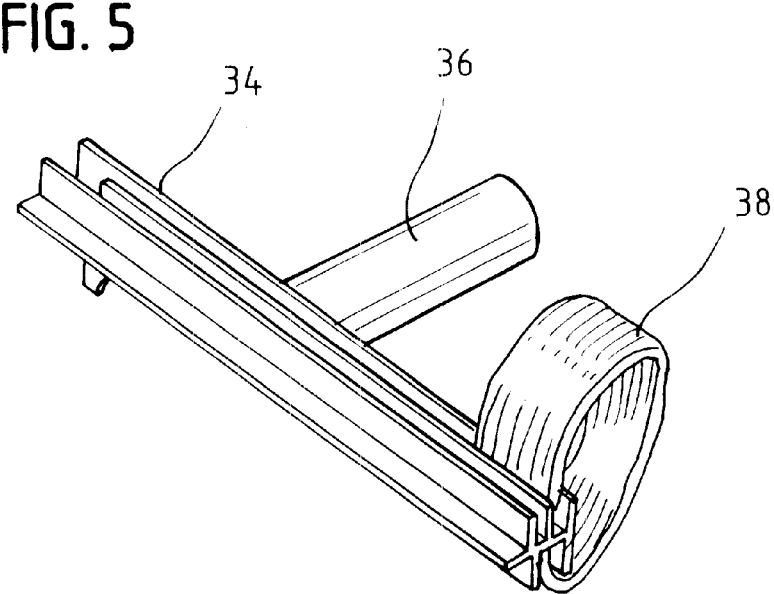
FIG. 5 is a perspective view of another embodiment of the hand tool of the present invention.

FIG. 4 is another embodiment of the invention of the present invention is shown in FIG. 4. The embodiment of FIG. 4 shows a different molding of the shafts 32 and 34 and handle 36. FIG. 5 shows another embodiment of the hand tool of FIG. 4. In FIG. 5, a single shaft 34 is shown attached to a handle 36. Shaft 34 is molded with an opening 34b formed therein, through which a brace 38 may be attached. In a one shaft configuration, brace 38 is looped back to shaft 34 such that the user's arm can be threaded there through and, during use, held parallel to shaft 34. As the user's arm is held to shaft 34 by brace 38 a similar effect is created as with the dual shaft system and brace. It is noted that the dual shaft system of FIGS. 1 and 4 is preferred as stability and strength are created with the dual shafts and handle.

Figure 6:
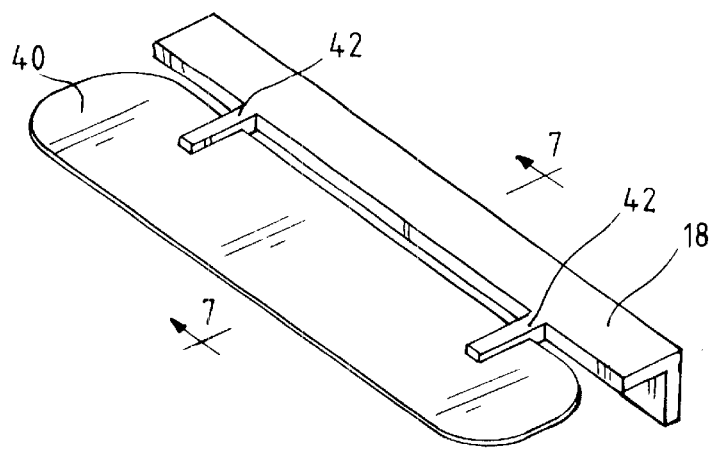
FIG. 6 is a perspective view of the support member or tool head of the tool of the present invention, having an ice scraper blade attached thereto.
Figure 7:
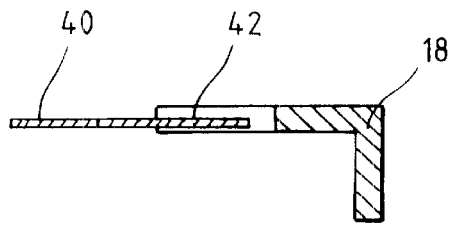
FIG. 7 is a cross sectional view, taken along the plane of line 7—7 of FIG. 6, of the support member and scraper blade of the present invention.

A support member 18 is shown in FIG. 6, with a scraper attachment 40 attached thereto. Scraper attachment 40 is of the type used to scrape ice off of automobiles. In the illustrative embodiment scraper attachment 40 is attached to support member 18 by brackets 42. It is to be understood that any conventional manner of attaching scraper attachment 40 to support member 18 may be used without departing from the novel scope of the present invention. FIG. 7 is a cross-sectional view of the scraper of FIG. 6 showing the attachment of scraper 42 to brackets 42 and support member 18.

Figure 8:
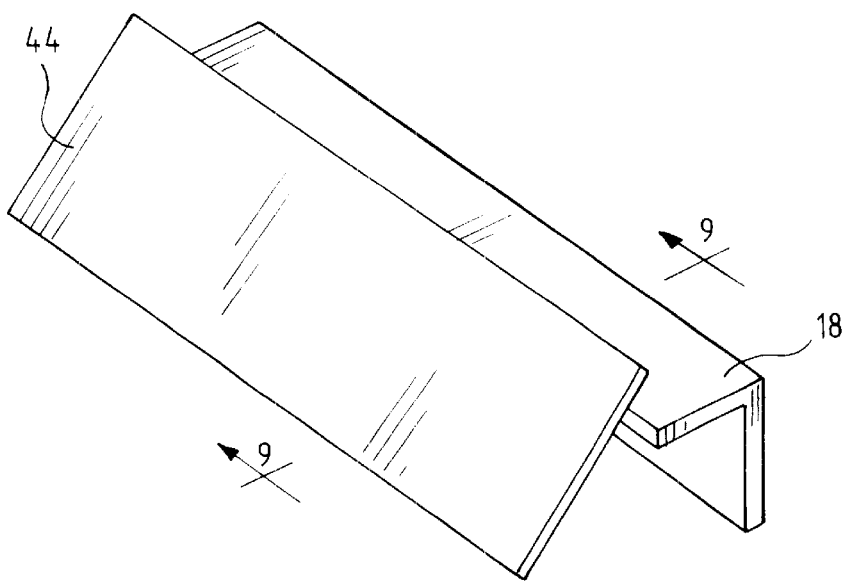
FIG. 8 is a perspective view of the support member of the hand tool of the present invention having a scrubber/sandpaper mount attached thereto.
Figure 9:
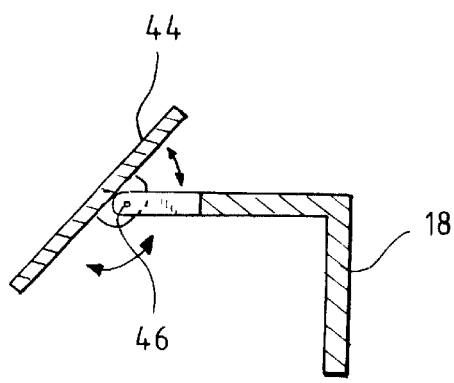
FIG. 9 is a cross-sectional view, taken along the plane of line 9—9 of the support member and scrubber/sandpaper mount of FIG. 8.

FIG. 8 shows support member 18 with a sandpaper or scrubber attachment 44 attached thereto. Sandpaper or scrubber attachment 44 is used as a base for either a sheet of sandpaper or a scrubbing pad. As can be seen in FIG. 9 a pivot 46, formed in any conventional manner, may be used to attach sandpaper or scrubber attachment 44 to support member 18. Pivot 46 is attached such that the sandpaper or scrubber attachment 44 may be applied more directly to the surface to be scrubbed or sanded. Further, as the tool is used, the angle of hand tool 10 may be shifted for the convenience of the user while the sandpaper or scrubber attachment 44 remains in contact with the work surface.

Figure 10:
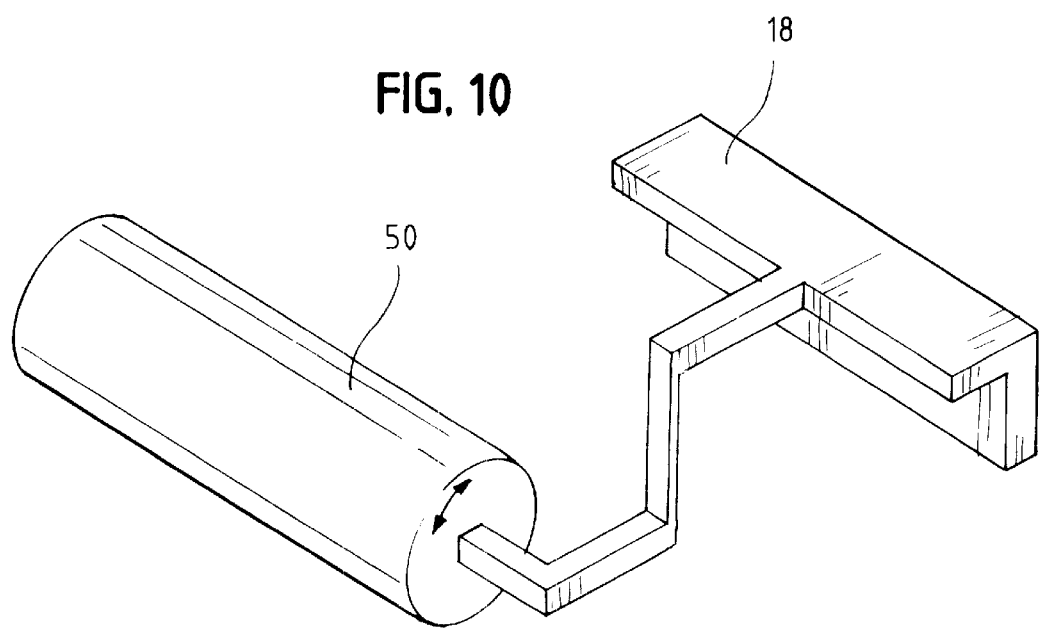
FIG. 10 is a perspective view of the support member of the hand tool of the present invention having a paint roller attached thereto.
Figure 11:
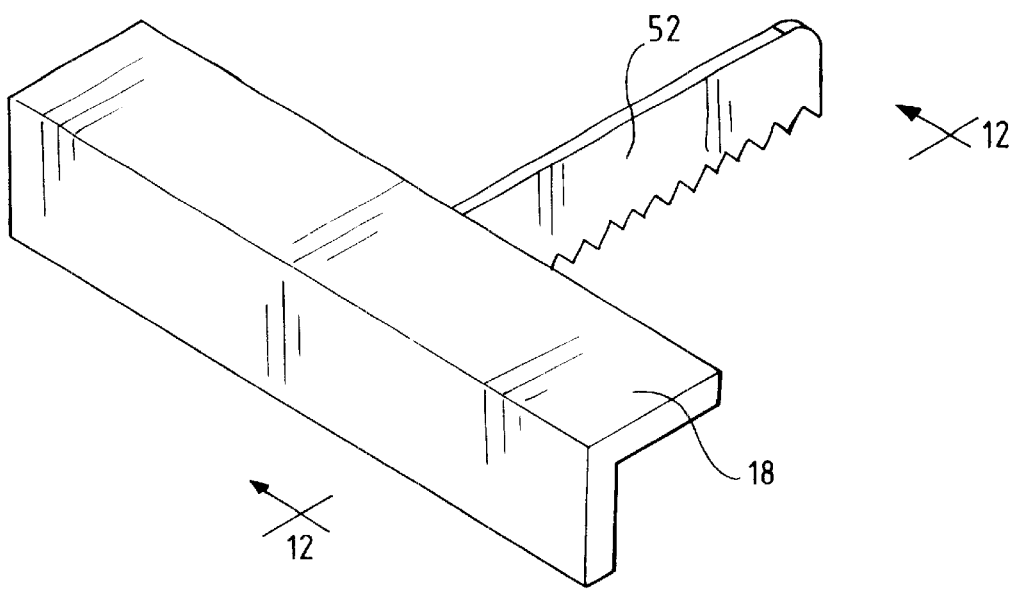
FIG. 11 is a perspective view of the support member of the hand tool of the present invention having a saw blade attached thereto.
Figure 12:
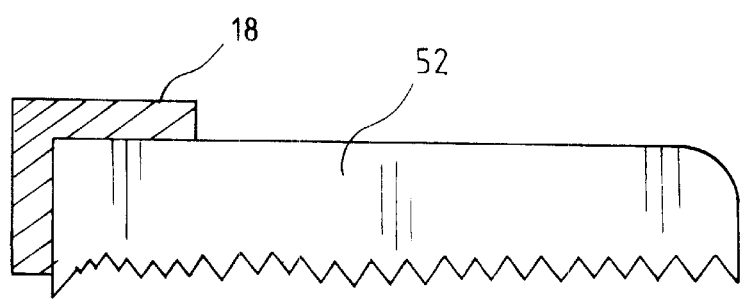
FIG. 12 is a cross-sectional view, taken along the plane of line 12—12, of the support member and saw blade of FIG. 11.
Figure 13:
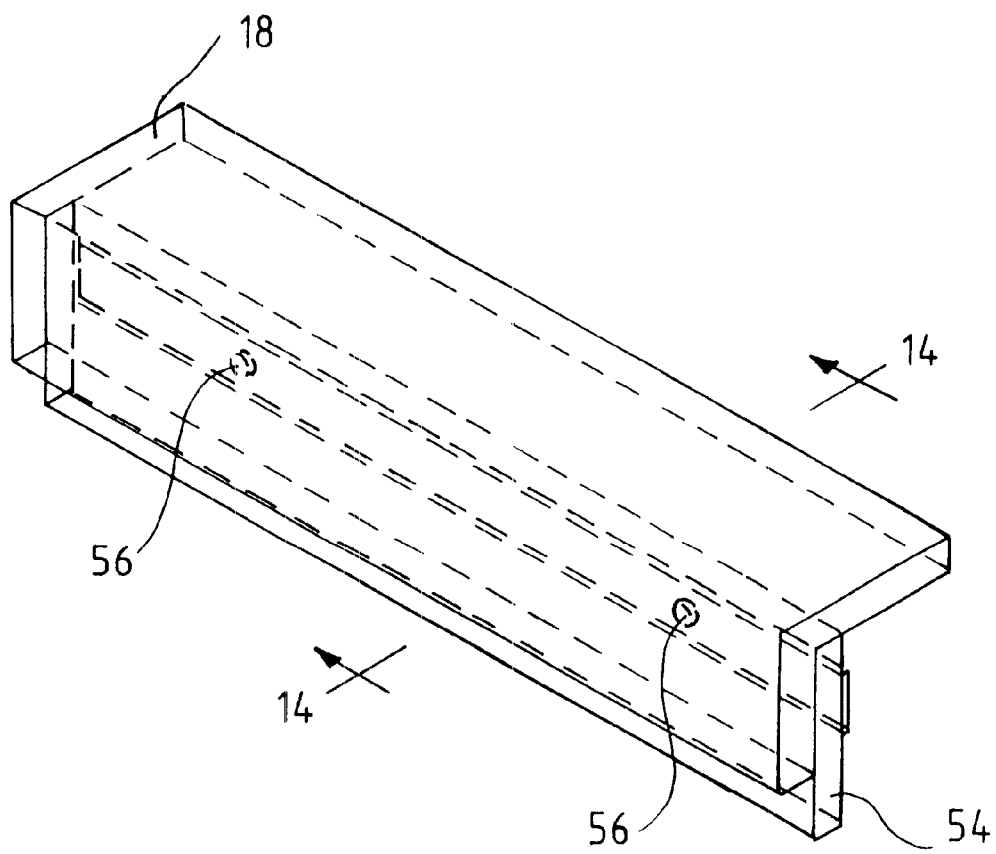
FIG. 13 is a perspective view of the support member of the hand tool of the present invention having a squeegee blade mount attached thereto.
Figure 14:
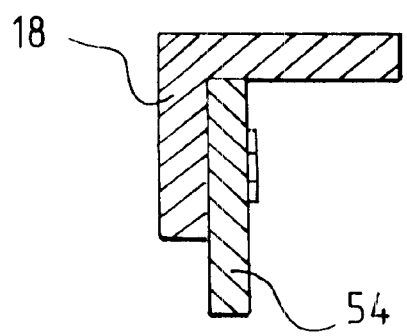
FIG. 14 is a cross-sectional view, taken along the plane of line 14—14 of FIG. 13, of the support member of the hand tool of the present invention having a squeegee blade mounted thereto.

FIG. 10 shows the attachment of a paint roller 50 to support member 18. FIGS. 11 and 12 show the attachment of a saw blade 52 to support member 18. In each of these applications, the tool head may be attached to the support member by any conventional means, such as adhesives or fasteners, to allow the user to apply his force in the direction of the task to be completed. FIGS. 13 and 14 show the attachment of a squeegee element 54 to support member 18. As illustrated, squeegee element 44 may be attached to support member 18 by conventional fasteners threaded through openings 56 in both the squeegee element 54 and support member 18.

In the use of the hand tool 10 of the present invention, the user may select from a number of different tool heads which can then be attached, as described above, to the support member 18. The user then grasps handle 16 and aligns his or her arm between shafts 12 and 14. Brace 22 may then be strapped about and/or over the user's arm. The user may then apply the tool head to the task to be completed.

Brace 22, because of its positioning (bridging shafts 12 and 14) provides a connection between the user's arm and hand tool 10, allowing the user's strength to be transferred from his arm to hand tool 10. By strapping the user's arm in alignment with shafts 12 and 14 and grasping handle 16, the user aligns his or her arm in the direction to which force will generally be applied to the task to be completed. The user's force may then be applied, from both the wrist and the site of connection of brace 22, for example the forearm or the upper arm (depending on the lengths of shafts 12 and 14 and the user's arm), relieving some pressure from the user's wrist.

By using strength from the user's arm the user is allowed to use his or her wrist to more accurately apply the hand tool 10 to the task. Further, the user's wrist, relieved of the requirement of channeling all of the user's force, will generally not fatigue as quickly, allowing the user to use the tool for longer periods of time than otherwise is possible for a standard hand tool.

Although illustrative embodiments of the invention have been shown and described, it is to be understood that various modifications and substitutions may be made by those skilled in the art without departing from the novel spirit and scope of the invention.

What is claimed is:

1. A hand tool for providing increased force and accuracy for a variety of tasks comprising:
   a tool head;
   a first shaft having a proximal end and a distal end, and a second shaft having a proximal end and a distal end, said shafts being each connected to said tool head to extend in generally similar directions;
   a handle having a first end and a second end, said handle being attached to said first shaft and said second shaft transversely thereto, and extending between said first and second shafts;
   a brace having a first end and a second end, said first end of said brace being attached to said first shaft, near said proximal end of said first shaft, and said second end of said brace being attached to said second shaft, near said proximal end of said second shaft;
   said brace generally aligning a person's arm with said first and second shafts when said handle is grasped by said person's hand and said tool head is applied to a task.

2. The hand tool of claim 1, wherein said brace is made of woven cloth.

3. The hand tool of claim 1, wherein said first and second shafts and said handle are unitarily molded together.

4. The hand tool of claim 1, wherein said proximal ends of said first and second shafts define openings through which said brace may be threaded.

5. The hand tool of claim 1 including a tool head platform for attachment of tool heads, attached to said distal ends of said first shaft and said second shaft, such that a tool head may be releasably attached to said tool head platform.

6. The hand tool of claim 5, wherein said first and second shafts, said handle and said tool head platform are unitarily molded together.

7. The hand tool of claim 1, wherein said tool head is pivotally attached to said tool head platform such that said tool head may remain in contact with a work surface when said hand tool is applied to a task.

8. A hand tool for providing increased force and accuracy for a variety of applications comprising:
   a tool head;
   a first shaft having a proximal end and a distal end and a second shaft having a proximal and a distal end, said distal ends of said shafts being spaced apart and being adapted for connection to said tool head, said proximal ends of said shafts defining openings;
   a handle having a first end and a second end, said first end of said handle being attached to said first shaft and said second end of said handle being attached to said second shaft;
   a tool head platform for attachment of tool heads, attached to said distal ends of said first shaft and said second shaft, such that a tool head may be releasably attached to said tool head platform;
   a flexible strap having a first end and a second end, said first end of said strap being threaded through said opening in said first shaft, and said second end of said strap being threaded through said opening in said second shaft, such that said strap spans said space between said first and second shafts and said handle and strap are generally parallel to each other;
   said flexible strap being adjustable such that when said tool is used, the user's arm is aligned by action of the strap with said first and second shafts when said handle is grasped and said tool head is applied to a work application.

9. The hand tool of claim 8, wherein said strap is made of woven cloth.

10. The hand tool of claim 8, wherein said strap is made of plastic.

11. The hand tool of claim 8, wherein said strap is made of metal.

12. The hand tool of claim 8, wherein said first and second shafts and said handle are unitarily molded together.

13. The hand tool of claim 8, wherein said first and second shafts, said handle and said tool head platform are unitarily molded together.

* * * * *